(12) United States Patent
Konishi et al.

(10) Patent No.: US 7,248,430 B2
(45) Date of Patent: Jul. 24, 2007

(54) MAGNETIC RECORDING AND REPRODUCTION APPARATUS

(75) Inventors: Akio Konishi, Sanda (JP); Koichiro Hirabayashi, Hirakata (JP); Hiroshi Kanchiku, Nara (JP); Hitoshi Yasutomi, Daito (JP); Takefumi Yanagihara, Saijo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 463 days.

(21) Appl. No.: 10/803,437

(22) Filed: Mar. 18, 2004

(65) Prior Publication Data

US 2004/0201004 A1 Oct. 14, 2004

(30) Foreign Application Priority Data

Mar. 19, 2003 (JP) ............................. 2003-075675

(51) Int. Cl.
*G11B 15/26* (2006.01)
(52) U.S. Cl. ...................................................... 360/85
(58) Field of Classification Search ..................... None
See application file for complete search history.

(56) References Cited

U.S. PATENT DOCUMENTS 5,638,231 A * 6/1997 Okuda et al. .................. 360/85

* cited by examiner

*Primary Examiner*—Hoa T. Nguyen
*Assistant Examiner*—Mark Blouin
(74) *Attorney, Agent, or Firm*—Renner, Otto, Boisselle & Sklar, LLP

(57) ABSTRACT

A magnetic recording and reproduction apparatus includes an arm section pivotable about a pivoting shaft; a tape guide section provided on the arm section for guiding a magnetic tape; a capstan section for driving the magnetic tape so as to run; and a maintaining section provided on the capstan section. The arm section is pivotable between a first location and a second location. The first location is a location at which the information recording to and/or information reproduction from the magnetic tape is possible. The second location is a location at which the information recording to and/or information reproduction from the magnetic tape is not possible. When the arm section pivots from the second location to the first location, the maintaining section maintains a relative position of the arm section, which is in the first location, to the capstan section.

7 Claims, 10 Drawing Sheets

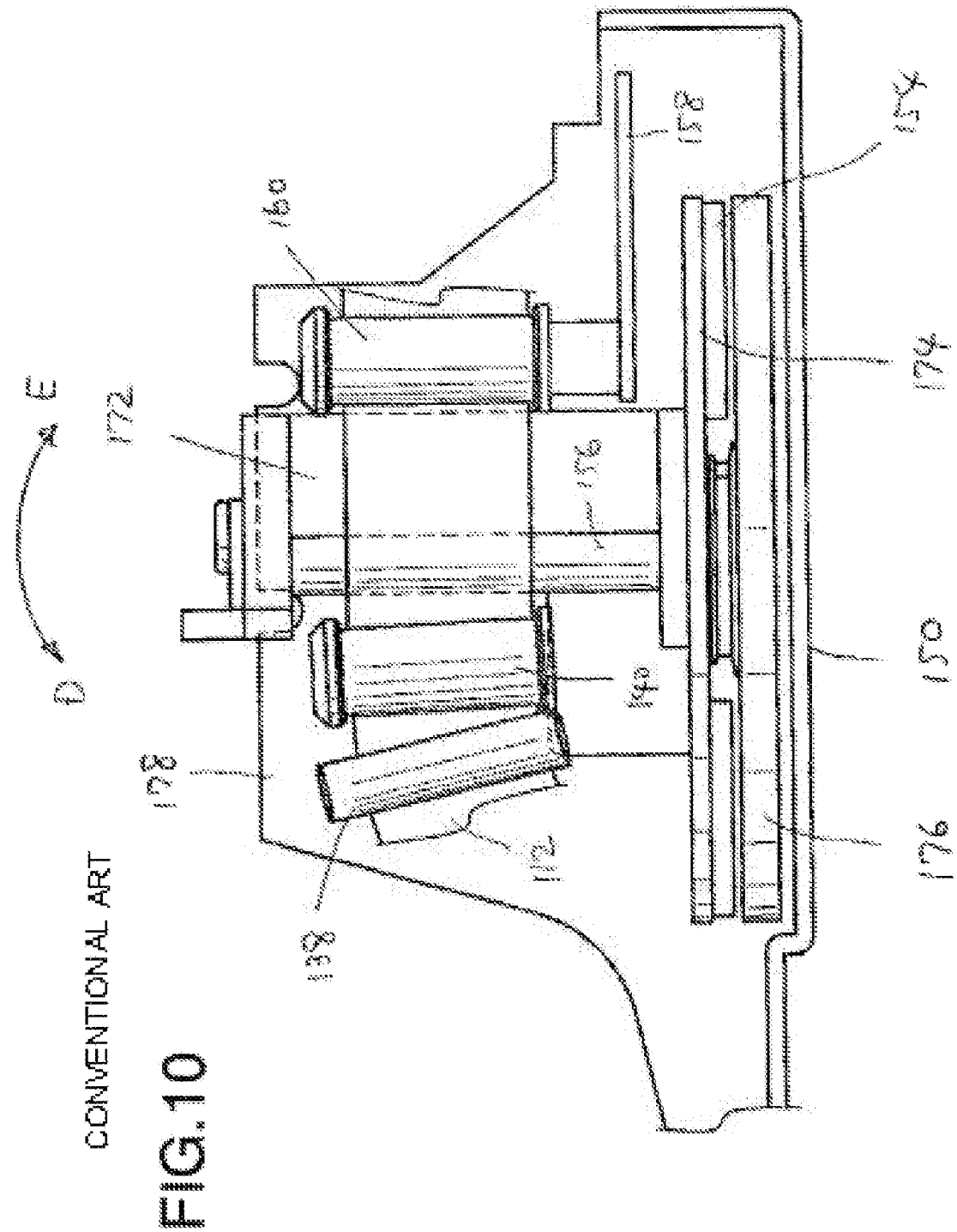

MAGNETIC RECORDING AND REPRODUCTION APPARATUS

This non-provisional application claims priority under 35 U.S.C., §119(a), on Patent Application No. 2003-075675 filed in Japan on Mar. 19, 2003, the entire contents of which are hereby incorporated by reference.

BACKGROUND OF THE INVENTION

1. Field of the Invention

The present invention relates to a magnetic recording and reproduction apparatus which is compact and lightweight and is superb in productivity.

2. Description of the Related Art

Recently, the reduction of the size, weight and production cost of magnetic recording and reproduction apparatuses has become desirable.

Hereinafter, a conventional magnetic recording and reproduction apparatus will be described.

A conventional magnetic recording and reproduction apparatus as described in Japanese Laid-Open Publication No. 11-273184 is known.

FIG. 8 is a plan view of a conventional magnetic recording and reproduction apparatus in a state where a cassette is mounted but a tape is not loaded (unloading mode). Some components are omitted from FIG. 8 for simplicity.

Reference numeral 110 represents a cassette, and reference numeral 112 represents a magnetic tape extended in the cassette 110. The magnetic tape 112 is wound around an S reel 113 and a T reel 119 accommodated in the cassette 110.

Reference numeral 118 represents a sub chassis, on which the cassette 110 is mountable. The sub chassis 118 is guided by guide sections (not shown) on both sides of a main chassis 150 and is movable in directions represented by arrows A and B.

Reference numeral 120 represents an S reel stand and reference numeral 122 represents a T reel stand, both of which are rotatably provided on the sub chassis 118. The S reel stand 120 is engageable with the S reel 113, and the T reel stand 122 is engageable with the T reel 119.

Reference numeral 124 represents a tension arm, which is provided on the sub chassis 118 so as to be pivotable about a tension arm shaft 126. A tension post 128 is provided at one end of the tension arm 124.

FIG. 9 shows the magnetic recording and reproduction apparatus shown in FIG. 8 in a tape reproduction or recording state (hereinafter, referred to as a "loading mode"). In this mode, the magnetic tape 112 is wound around the tension post 128. The tension post 128 varies the tension of the tension band 130 in accordance with the tension of the magnetic tape 112, and controls the rotation torque of the S reel stand 120 around which the tension band 130 is wound.

Reference numeral 132 represents an S boat and reference numeral 134 represents a T boat. The S boat 132 has an S1 post 136 provided thereon, and the T boat 134 has a T1 post 138 and a T2 post 140 provided thereon. In order to obtain the loading mode shown in FIG. 9, the magnetic tape 112 is pulled out from the cassette 110 along boat guide grooves 142 and 144 and wound around a cylinder 146.

Reference numeral 148 represents a pinch arm pivotably supported by the main chassis 150. A pinch roller 152 is provided at one end of the pinch arm 148.

In order to obtain the loading mode shown in FIG. 9, the pinch arm 148 is pivoted clockwise and pressure-contacts the pinch roller 152 by a pressure-contacting spring (not shown) to a capstan shaft 156 of a capstan 154 with the magnetic tape 112 sandwiched between the pinch roller 152 and the capstan shaft 156. The capstan 154 is provided on the main chassis 150.

Reference numeral 158 represents a T3 post arm, which is supported by the sub chassis 118 to be pivotable about a pivoting shaft 159.

A T3 post 160 is provided at one end of the T3 post arm 158, and a cam pin 161 is provided at the other end of the T3 post arm 158. The cam pin 161 is in engagement with a cam groove 151 formed in the main chassis 150. While the sub chassis 118 moves in the direction of arrow A to place the magnetic recording and reproduction apparatus into the loading mode shown in FIG. 9, the engagement of the cam pin 161 and the cam groove 151 pivots the T3 post arm 158 clockwise, so that the T3 post 160 at the end of the T3 post arm 158 pulls out the magnetic tape 112 from the cassette 110 and winds the magnetic tape 112 around the capstan shaft 156.

The movement of the sub chassis 118 in the directions of arrows A and B is driven by cams (not shown) provided for the elements described above by the rotation of a loading motor 151. The transformation of the magnetic recording and reproduction apparatus from the unloading mode shown in FIG. 8 to the loading mode shown in FIG. 9 is driven by the cams.

FIG. 10 is a front view of the capstan shaft 156 in the loading mode shown in FIG. 9.

The capstan 154 has the following structure. A stator 174 of a motor is secured to a housing 172, and the capstan shaft 156 provided with a rotor 176 is rotatably supported.

The housing 172 is secured to a rear wall 178 of the main chassis 150 by screws 180 (FIG. 9) in the state where the running of the magnetic tape 112 has been adjusted. The rear wall 178 is formed by drawing.

As shown in FIG. 10, the running of the magnetic tape 112 is adjusted by pivoting the housing 172 in directions represented by arrow D and E. Thus, the magnetic tape 112 can run with no possibility of being damaged.

The above-described magnetic recording and reproduction apparatus have the following problems.

When a large tension is generated in the magnetic tape 112, a large force is generated in the T3 post 160 in a direction represented by arrow F (FIG. 9). As a result, a problem occurs that the T3 post arm 158 may be easily deformed, or the T3 post 160 may be positionally deviated, easily damaging the magnetic tape 112.

While the capstan shaft 156 is pivoted in the directions of arrows D and E for adjusting the running of the magnetic tape 112, it is desirable to maintain the T3 post 160 parallel to the capstan shaft 156 in order to avoid damaging the magnetic tape 112. However, this is difficult since the capstan shaft 156 is provided on the main chassis 150 and the T3 post 160 is provided on the sub chassis 118.

SUMMARY OF THE INVENTION

A magnetic recording and reproduction apparatus includes an arm section pivotable about a pivoting shaft; a tape guide section provided on the arm section for guiding a magnetic tape; a capstan section for driving the magnetic tape so as to run; and a maintaining section provided on the capstan section. The arm section is pivotable between a first location and a second location. The first location is a location at which information recording to and/or information reproduction from the magnetic tape is possible. The second location is a location at which information recording to and/or information reproduction from the magnetic tape is not possible. When the arm section pivots from the second location to the first location, the maintaining section maintains a relative position of the arm section, which is in the first location, to the capstan section.

In one embodiment of the invention, as the arm section pivots from the second location to the first location, the tape guide section pulls out the magnetic tape.

In one embodiment of the invention, the tape guide section is provided on the arm section so as to maintain a relative tilt of the tape guide section to the arm section. The maintaining section is provided on the capstan section so as to maintain a relative tilt of the maintaining section to the capstan section. When the arm pivots from the second location to the first location, the maintaining section maintains a relative tilt of the arm section, which is in the first location, to the capstan section.

In one embodiment of the invention, the magnetic recording and reproduction apparatus further includes a cylinder for recording information to and/or reproducing information from the magnetic tape; a first chassis section having the cylinder provided thereon; and a second chassis section on which a cassette accommodating the magnetic tape is mountable, the second chassis section being movable with respect to the first chassis section. In accordance with the movement of the second chassis section, the arm section pivots from the second location to the first location.

In one embodiment of the invention, the first chassis section has a first chassis surface having the cylinder thereon, and a second chassis surface substantially perpendicular to the first chassis surface. The capstan section includes a pivoting adjusting section for pivoting the capstan section along a plane parallel to the second chassis surface so as to adjust a tilt of the capstan section. The second chassis surface has an engaging section engageable with the pivoting adjusting section. The pivoting adjusting section pivots in accordance with the pivoting of the capstan section. The center of pivoting of the pivoting adjusting section substantially matches the position of the maintaining section.

In one embodiment of the invention, when the arm section pivots from the second location to the first location, the tape guide section is located in the vicinity of the maintaining section.

In one embodiment of the invention, the magnetic recording and reproduction apparatus further includes a plurality of guide posts for guiding the magnetic tape. One of the plurality of guide posts is the tape guide section. When the arm section pivots from the second location to the first location, the tape guide section is closest to the capstan section among the plurality of guide posts.

A magnetic recording and reproduction apparatus has a structure in which a T3 post arm is secured to the housing of the capstan.

Owing to such a structure, the tilt of the T3 post is integrally adjusted with the tilt of the capstan shaft, and the magnetic tape can be protected against being damaged.

Thus, the invention described herein makes possible the advantages of providing a magnetic recording and reproduction apparatus which avoids damaging a magnetic tape with a simple structure.

These and other advantages of the present invention will become apparent to those skilled in the art upon reading and understanding the following detailed description with reference to the accompanying figures.

BRIEF DESCRIPTION OF THE DRAWINGS

FIG. 10 is a partial front view of the conventional magnetic recording and reproduction apparatus.

DESCRIPTION OF THE PREFERRED EMBODIMENTS

According to the present invention, a magnetic recording and reproduction apparatus includes a second chassis section which can be in a second state where a cassette accommodating a magnetic tape can be mounted or taken out or a first state where the magnetic tape can run; a capstan section including a capstan shaft for driving the magnetic tape, a housing for rotatably supporting the capstan shaft, and a motor section for driving the capstan shaft; a first chassis section for supporting the second chassis section so as to be movable between a first position corresponding to the first state of the second chassis section and a second position corresponding to the second state of the second chassis section; a pull-out post section including a tape guide post attached to a tip of an arm which is pivotably supported by the second chassis section; and a restriction section integrally formed with the housing of the capstan section for restricting the position of the pull-out post section. In the first state in which the second chassis is at the first position, the tape guide post of the pull-out post section is in engagement with the restriction section and thus positioned. The tilt of the pull-out post section is integrally adjusted with the tilt of the capstan section.

Also according to the present invention, the first chassis section includes a first surface for supporting some of the components and a second surface perpendicular to the first surface for securing the capstan section. The housing is secured to the second surface of the first chassis section. A pivoting adjusting section and a securing section are provided on the second surface, such that the housing can be optimally adjusted in a limited range when the housing is temporarily secured. The pivoting center of the pivoting adjusting section substantially matches the position of the restriction section. Thus, even after the tilt of the capstan section is adjusted, the height of the pull-out section is not changed, and no extra force is generated.

According to the present invention, the restriction section is provided in the vicinity of the pull-out post section in the first state of the second chassis section. Even when the tilt of the capstan section is adjusted, the height of the pull-out post section is not changed.

Hereinafter, the present invention will be described byway of illustrative examples with reference to the FIGS. 1 through 7.

Figure 1:
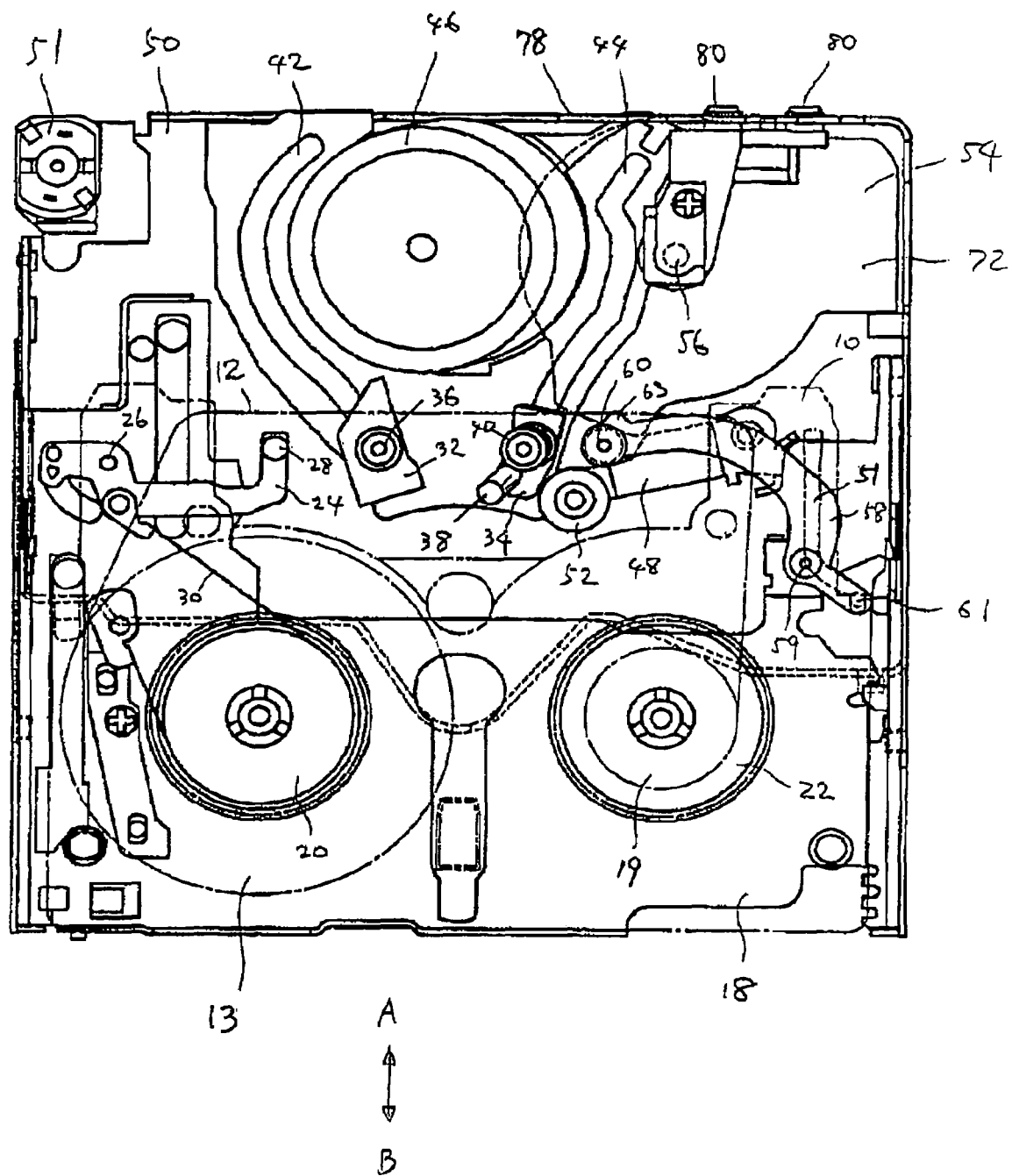
FIG. 1 is a plan view of a magnetic recording and reproduction apparatus according to an example of the present invention in a state where a tape cassette is mounted but a tape is not loaded (unloading mode)

FIG. 1 is a plan view of a magnetic recording and reproduction apparatus according to the present invention in a state where a tape cassette is mounted but a tape is not loaded (hereinafter, referred to as an "unloading mode" or "second state"). In FIG. 1, some parts are omitted for the sake of simplicity.

Reference numeral 10 represents a tape cassette, and reference numeral 12 represents a magnetic tape extended in the tape cassette 10. The magnetic tape 12 is wound around an S reel 13 and a T reel 19 accommodated in the tape cassette 10.

Reference numeral 18 represents a sub chassis (second chassis section), on which the tape cassette 10 is mountable. The sub chassis 18 has side walls 62 (FIG. 3) along both sides of a main chassis 50 (first chassis section) and projections 64 respectively provided on the side walls 62. The side walls 62 are formed by drawing. The sub chassis 18 is guided by the projections 64 being guided along guide grooves 68 of the main chassis 50. Thus, the sub chassis 18 is movable in directions represented by arrows A and B. The main chassis 50 includes a first chassis surface having a cylinder 46 provided thereon and a second chassis surface. The cylinder 46 is provided for recording information to and/or reproducing information from the magnetic tape 12.

Reference numeral 20 represents an S reel stand and reference numeral 22 represents a T reel stand, both of which are rotatably provided on the sub chassis 18. The S reel stand 20 is engageable with the S reel 13, and the T reel stand 22 is engageable with the T reel 19.

Reference numeral 24 represents a tension arm (arm section), which is provided on the sub chassis 18 so as to be pivotable about a tension arm shaft 26. A tension post 28 is provided at one end of the tension arm 24.

Figure 2:
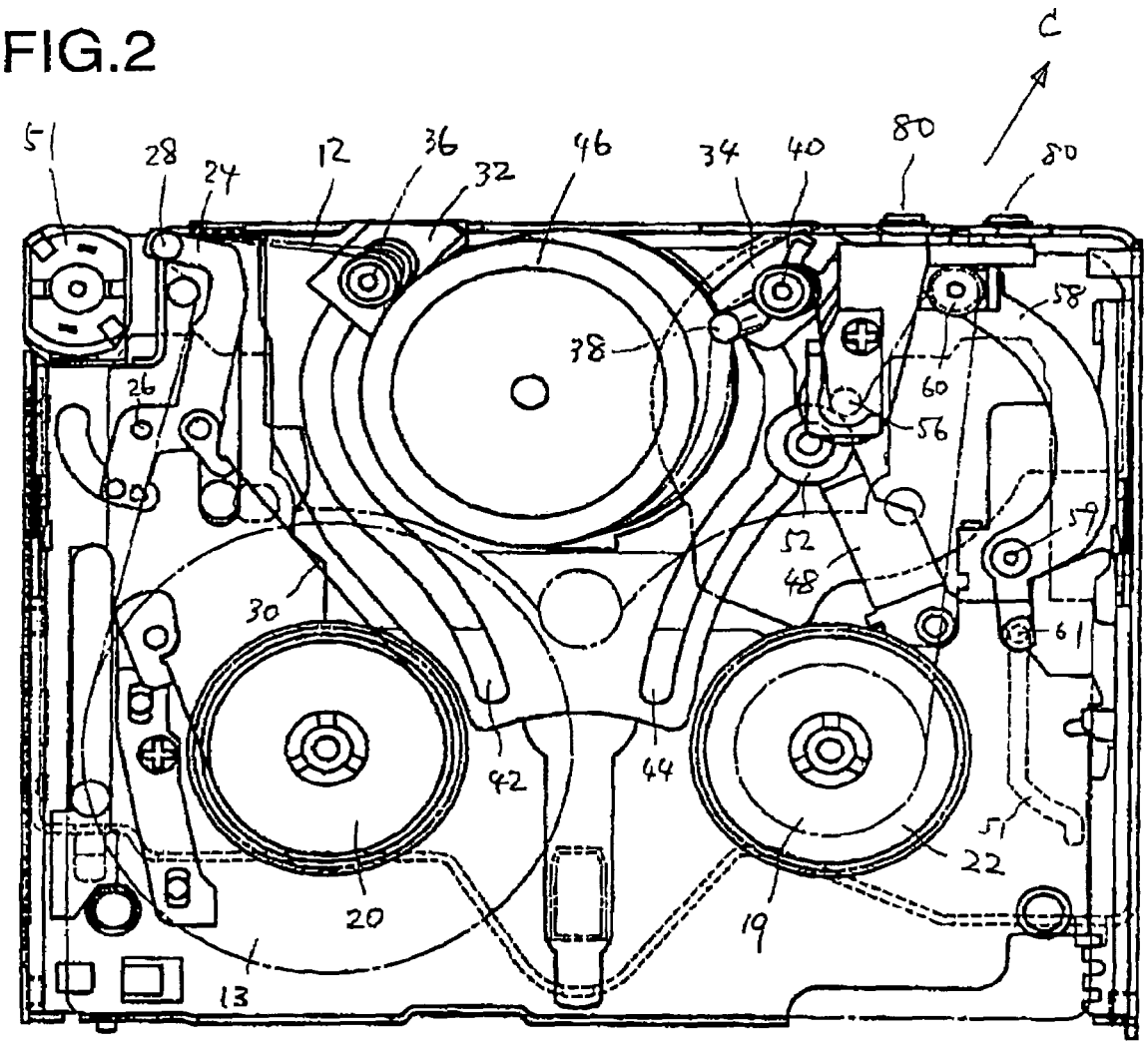
FIG. 2 is a plan view of the magnetic recording and reproduction apparatus shown in FIG. 1 in a tape reproduction or recording state (loading mode)

FIG. 2 shows the magnetic recording and reproduction apparatus shown in FIG. 1 in a tape reproduction or recording state (hereinafter, referred to as a "loading mode" or "first state"). In this mode, the magnetic tape 12 is wound around the tension post 28. The tension post 28 varies the tension of the tension band 30 in accordance with the tension of the magnetic tape 12, and controls the rotation torque of the S reel stand 20 along which the tension band 30 is wound.

Reference numeral 32 represents an S boat and reference numeral 34 represents a T boat. The S boat 32 has an S1 post 36 provided thereon, and the T boat 34 has a T1 post 38 and a T2 post 40 provided thereon. In order to obtain the loading mode shown in FIG. 2, the magnetic tape 12 is pulled out from the tape cassette 10 along boat guide grooves 42 and 44 and wound around the cylinder 46.

Reference numeral 48 represents a pinch arm pivotably supported by the main chassis 50. A pinch roller 52 is provided on one end of the pinch arm 48.

In order to obtain the loading mode shown in FIG. 2, the pinch arm 48 is pivoted clockwise and pressure-contacts the pinch roller 52 by a pressure-contacting spring (not shown) to a capstan shaft 56 of a capstan 54 with the magnetic tape 12 sandwiched between the pinch roller 52 and the capstan shaft 56. The capstan 54 is provided on the main chassis 50.

Figure 3:
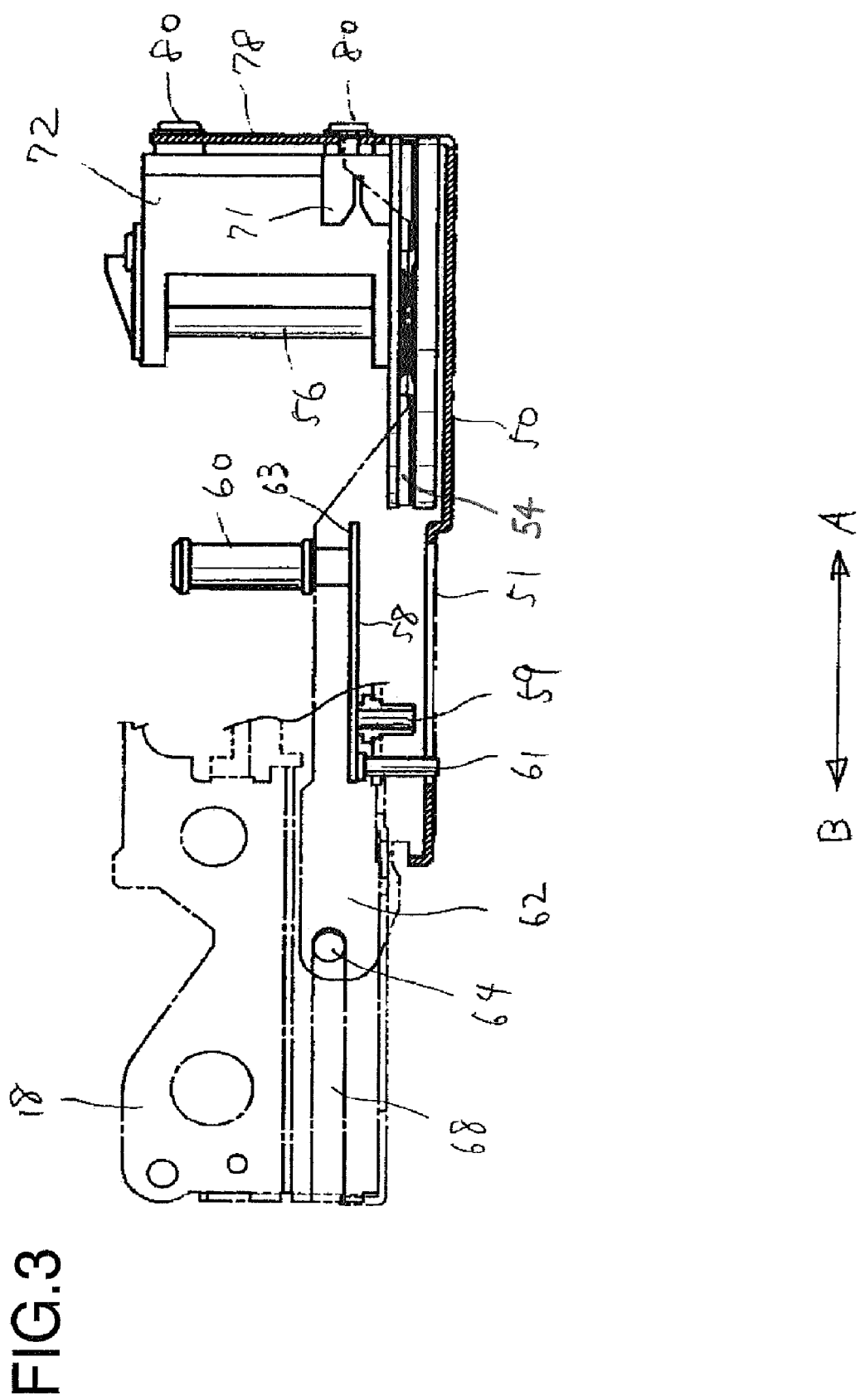
FIG. 3 is a partially cut side view of the magnetic recording and reproduction apparatus shown In FIG. 1 in the unloading mode.
Figure 4:
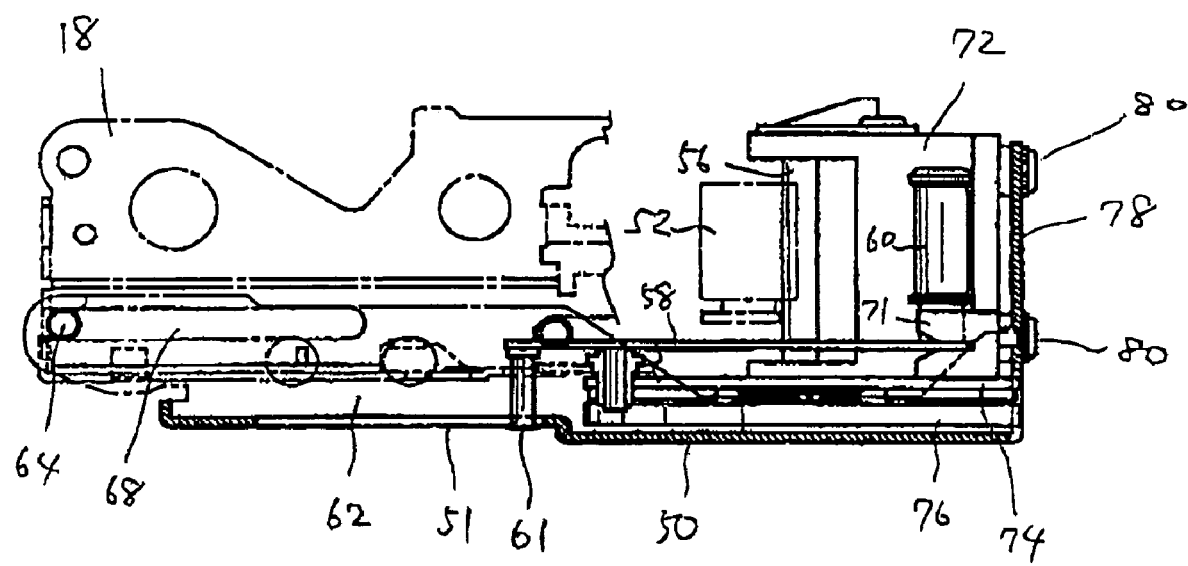
FIG. 4 is a partially cut side view of the magnetic recording and reproduction apparatus shown in FIG. 2 in the loading mode.

The capstan 54 is shown in detail in FIG. 3. A stator 74 of a motor is secured to a housing 72, and the capstan shaft 56 provided with a rotor 76 is rotatably supported.

Reference numeral 58 represents a T3 post arm, which is supported by the sub chassis 18 so as to be pivotable about a pivoting shaft 59.

A T3 post 60 (tape guide section) is provided at one end of the T3 post arm 58 such that, for example, a relative tilt of the T3 post 60 to the T3 post arm 58 is maintained. A cam pin 61 is provided at the other end of the T3 post arm 58. The cam pin 61 is engaged with a cam groove 51 formed in the main chassis 50. While the sub chassis 18 moves in the direction of arrow A to place the magnetic recording and reproduction apparatus into the loading mode shown in FIG. 2, the engagement of the cam pin 61 and the cam groove 51 pivots the T3 post arm 58 clockwise, i.e., from a second location to a first location. As a result, the T3 post 60 at the end of the T3 post arm 58 pulls out the magnetic tape 12 from the cassette 10 and winds the magnetic tape 12 around the capstan shaft 56. The first location of the T3 post arm 58 corresponds to the first state of the sub chassis 18 (FIG. 2), and the second location of the T3 post arm 58 corresponds to the second state of the sub chassis 18 (FIG. 1).

On the housing 72 of the capstan 54, a V-shaped groove section 71 (maintaining section) is provided such that a tilt of the V-shaped groove section 71 to the capstan 54 is maintained. The V-shaped groove section 71 may be integrally formed with the capstan 54. The V-shaped groove section 71 is provided for holding a tip 63 of the T3 post arm 58 and positioning the T3 post arm 58.

Figure 5:
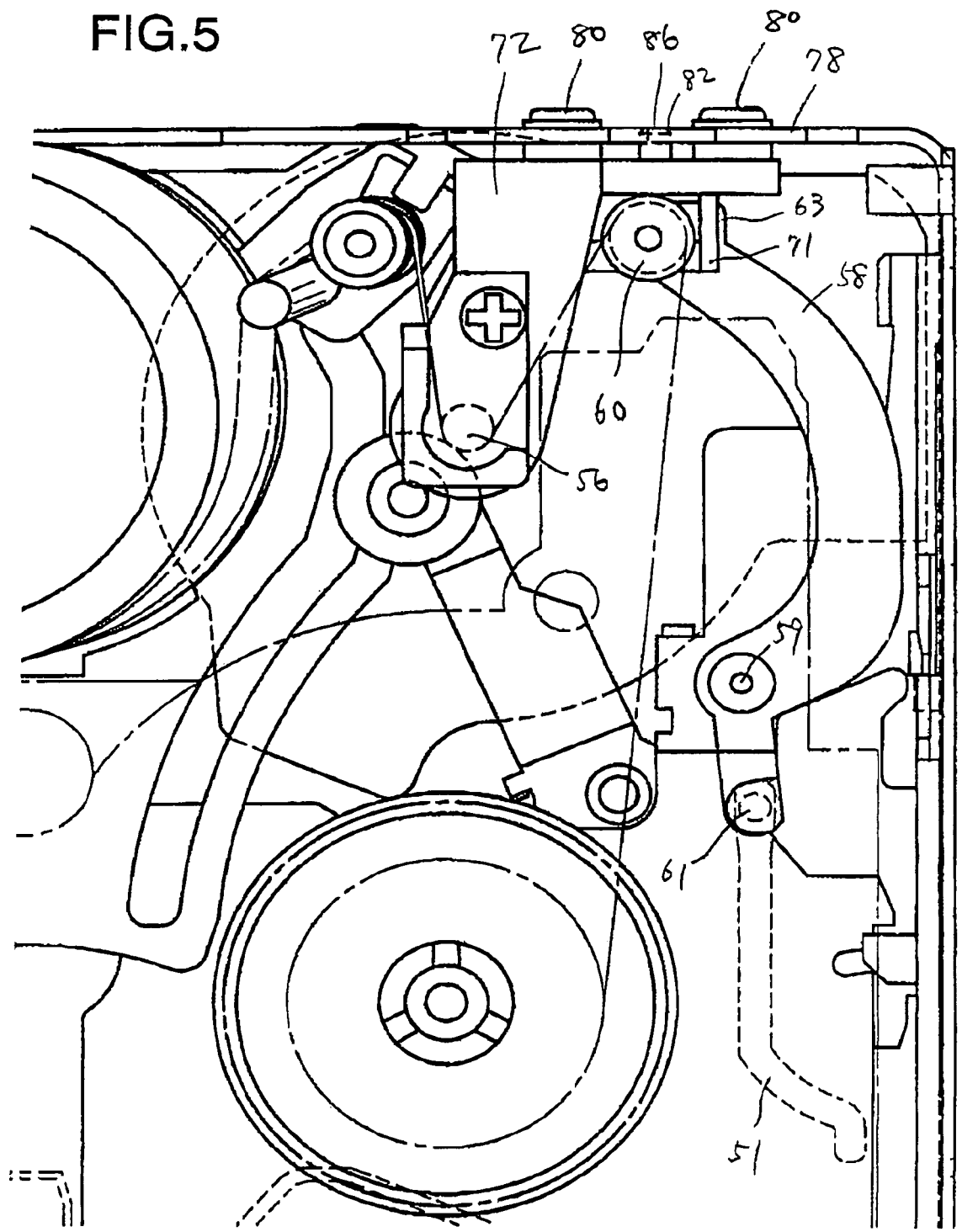
FIG. 5 is a partial plan view of the magnetic recording and reproduction apparatus shown in FIG. 2 in the loading mode.
Figure 6:
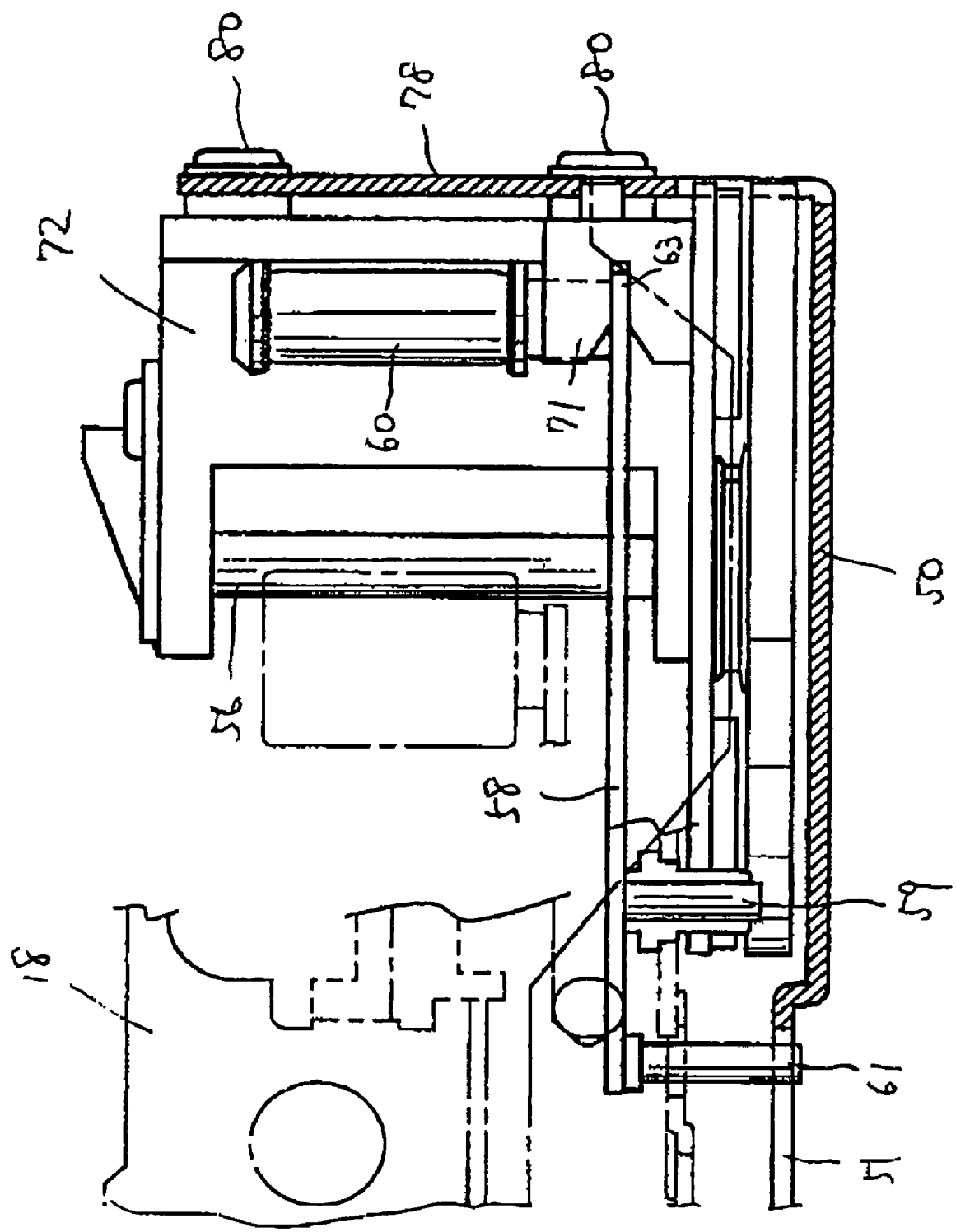
FIG. 6 is a partially cut side view of the magnetic recording and reproduction apparatus shown in FIG. 2 in the loading mode.

The tip 63 of the T3 post arm 58 moves in the direction of arrow A by the movement of the sub chassis 18 in the direction of arrow A. Then, as shown in FIGS. 5 and 6, the T3 post arm 58 is engaged with the V-shaped groove section 71. Thus, a relative position of the T3 post arm 58 to the housing 72 is maintained. For example, the height or tilt of the T3 post arm 58 with respect to the housing 72 is restricted. In this state, the T3 post 60 is located in the vicinity of the V-shaped groove section 71. Also in this state, the T3 post 60 is closest to the capstan 54 among a plurality of guide posts for guiding the magnetic tape 12 (the tension post 28, the S1 post 36, the T1 post 38, and the T2 post 40).

The movement of the sub chassis 18 in the directions of arrows A and B is driven by cams (not shown) provided for the elements described above by the rotation of a loading motor 51. The transformation of the magnetic recording and reproduction apparatus from the unloading mode shown in FIG. 1 to the loading mode shown in FIG. 2 is driven by the cams.

Figure 7:
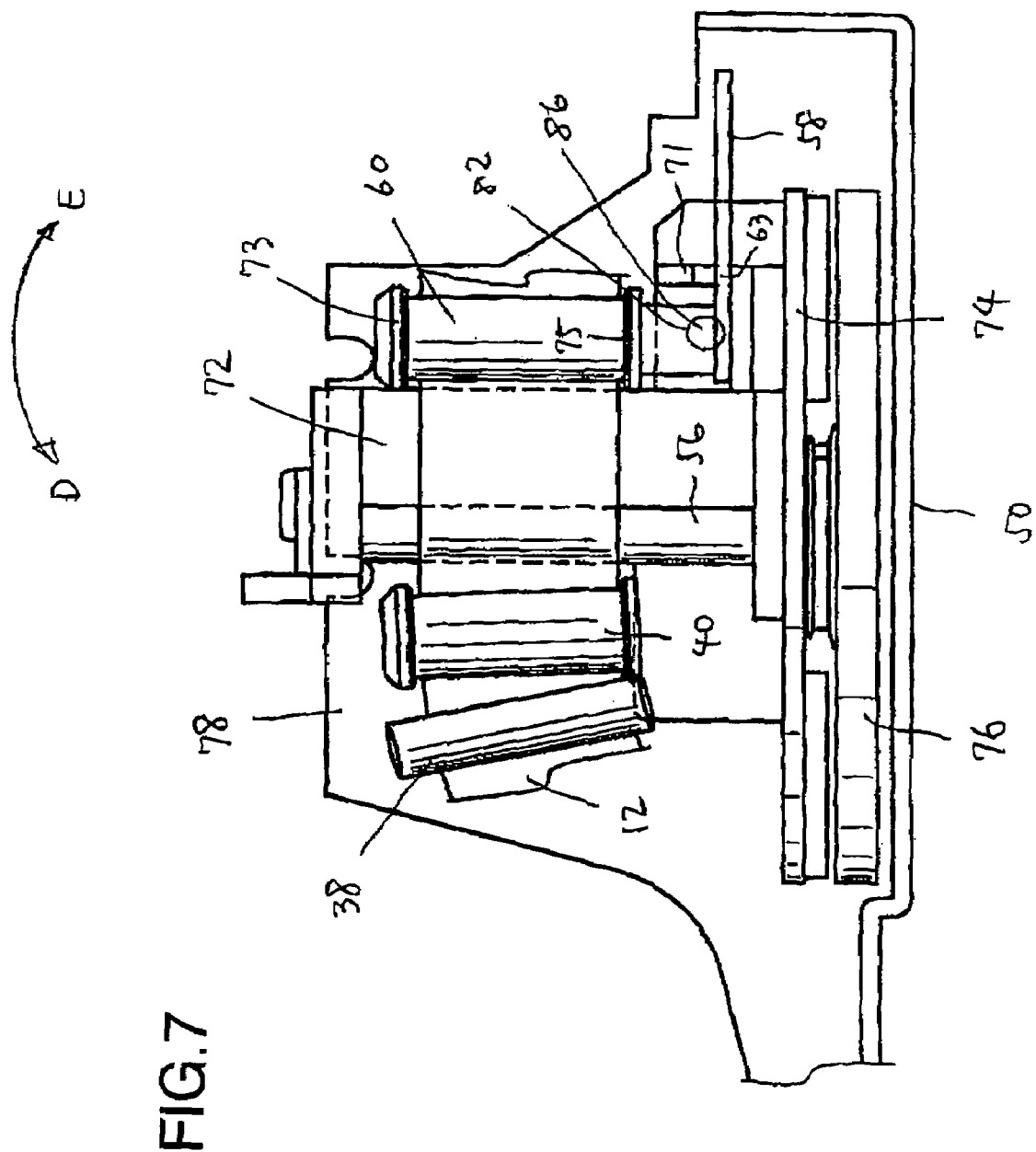
FIG. 7 is a partial front view of the magnetic recording and reproduction apparatus.
Figure 8:
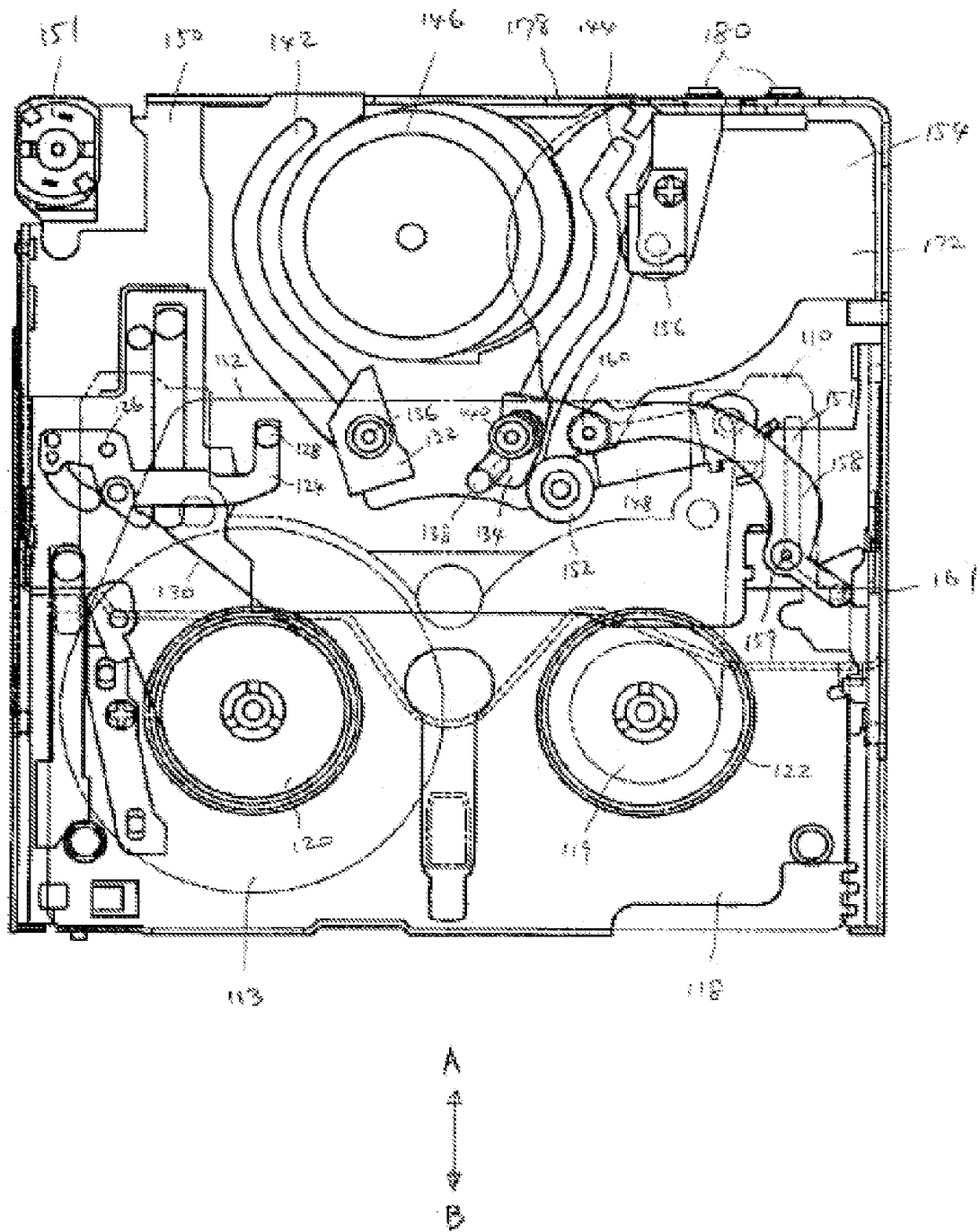
FIG. 8 is a plan view of a conventional magnetic recording and reproduction apparatus in the unloading mode.
Figure 9:
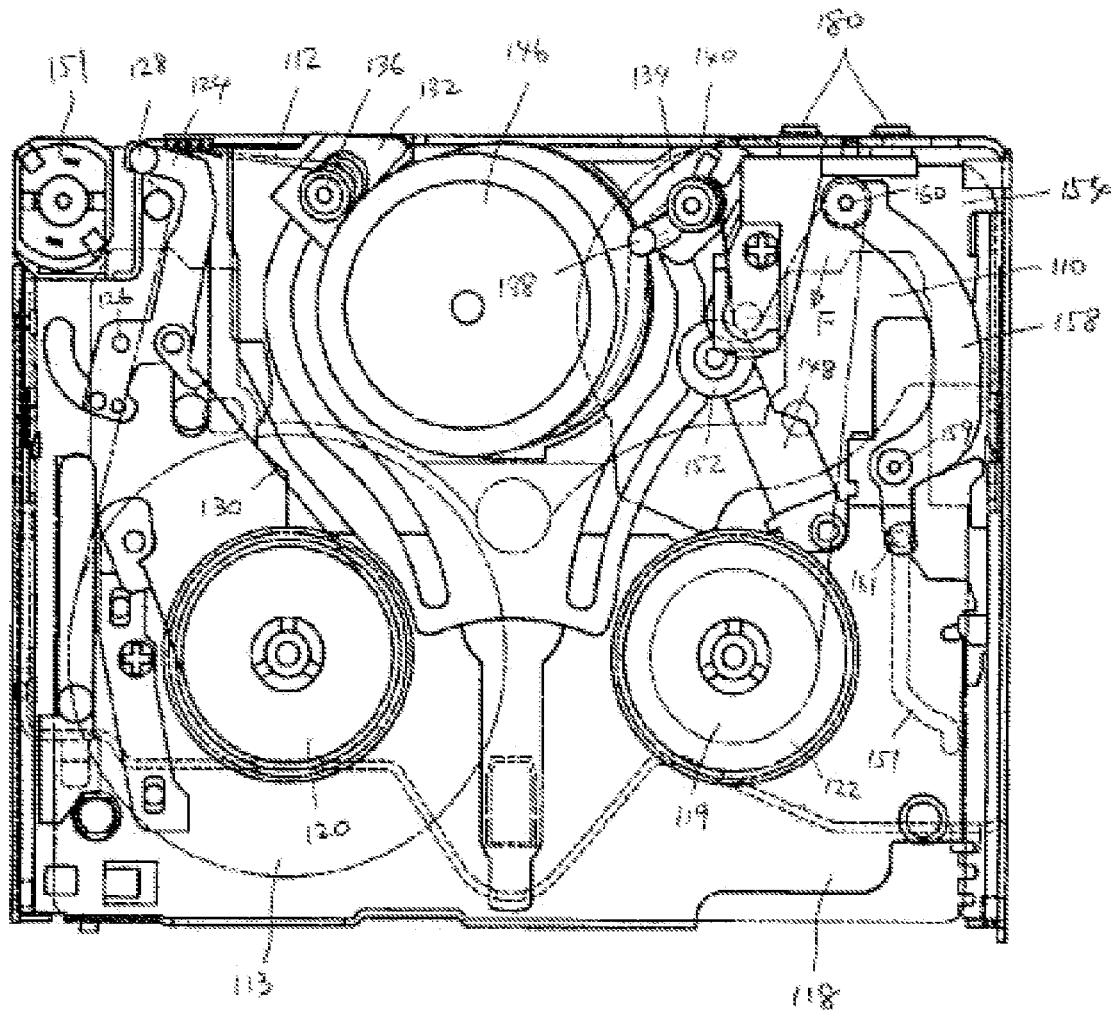
FIG. 9 is a plan view of the conventional magnetic recording and reproduction apparatus shown in FIG. 8 in the loading mode.

The housing 72 is secured to a rear wall 78 of the main chassis 50 by screws 80 (FIG. 4) in the state where the running of the magnetic tape 12 has been adjusted. The rear wall 78 is formed by drawing. The rear wall 78 has a positioning hole 82 (FIG. 7; engaging section). A positioning projection 86 (pivoting adjusting section) provided on the housing 72 is engaged with the positioning hole 82, and thus the capstan 54 is positioned and secured to the rear wall 78.

FIG. 7 is a front view of the capstan shaft 56 in the loading mode.

As shown in FIG. 7, the positioning projection 86 is provided in the vicinity of the intersection of the T3 post 60 and the T3 post arm 58 when seen in a direction vertical to the rear wall 78, more specifically, from the frontal direction.

The tilt of the capstan shaft 56 is adjusted by pivoting the housing 72 in the directions of arrows D and E about the positioning projection 86. For example, the positioning projection 86 substantially matches the position of the V-shaped groove section 71.

Since the tip 63 of the T3 post 60 is held in the V-shaped groove section 71 provided in the housing 72, the tilt of the T3 post 60 is adjusted integrally with the tilt of the capstan shaft 56.

If the height of the T3 post 60 was changed by the adjustment, top and bottom perimeters of the magnetic tape 12 would be easily damaged since the magnetic tape 12 is interposed between upper and lower flanges 73 and 75. According to the present invention, the positioning projection 86 as the pivoting center of the housing 72 and the V-shaped groove section 71 are located in the vicinity of the T3 post 60. Therefore, the heights of the upper and lower flanges 73 and 75 are not changed and thus the magnetic tape 12 is not damaged by the adjustment.

The T3 post arm 58 is twisted at a very small angle by the adjustment, and the degree of twisting of the T3 post arm 58 can be restricted to a minimum degree because the center of the twisting substantially matches the height of the T3 post arm 58. Thus, the twisting of the T3 post 58 does not have any large stress on a pivoting shaft 59 or the sub chassis 18.

As described above, in a magnetic recording and reproduction apparatus of the present invention, when the arm section moves from the second location (corresponding to the second state of the second chassis section where the information recording to and/or information reproduction from the magnetic tape is not possible) to the first location (corresponding to the first state of the second chassis section where the information recording to and/or information reproduction from the magnetic tape is possible), the maintaining section provided on the capstan section maintains the relative position of the arm section, which is in the first location, to the capstan section.

Therefore, even when the magnetic tape strongly pulls the tape guide section while the arm is in the first location, the relative position of the capstan section to the tape guide section does not change.

As a result, damage to the magnetic tape which is caused by a change in the relative position of the capstan section to the tape guide section can be prevented.

As described above, according to the present invention, a V-shaped groove section engageable with the T3 post arm is provided in the housing of the capstan. Therefore, even when the tilt of the capstan shaft is adjusted, the relative position of the capstan shaft to the T3 post is not changed, and thus the magnetic tape is protected against being damaged.

Since the pivoting center for the tilt adjustment is in the vicinity of the height of the T3 post arm, a large stress is not generated by the adjustment.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:
    an arm section pivotable about a pivoting shaft;
    a tape guide section provided on the arm section for guiding a magnetic tape;
    a capstan section for driving the magnetic tape so as to run; and
    a maintaining section provided on the capstan section; wherein:
    the arm section is pivotable between a first location and a second location;
    the first location is a location at which the information recording to and/or information reproduction from the magnetic tape is possible;
    the second location is a location at which the information recording to and/or information reproduction from the magnetic tape is not possible; and
    when the arm section pivots from the second location to the first location, the maintaining section maintains a relative position of the arm section, which is in the first location, to the capstan section.

2. A magnetic recording and reproduction apparatus according to claim 1, wherein as the arm section pivots from the second location to the first location, the tape guide section pulls out the magnetic tape.

3. A magnetic recording and reproduction apparatus according to claim 1, wherein:
    the tape guide section is provided on the arm section so as to maintain a relative tilt of the tape guide section to the arm section;
    the maintaining section is provided on the capstan section so as to maintain a relative tilt of the maintaining section to the capstan section; and
    when the arm pivots from the second location to the first location, the maintaining section maintains a relative tilt of the arm section, which is in the first location, to the capstan section.

4. A magnetic recording and reproduction apparatus according to claim 1, further comprising:
    a cylinder for recording information to and/or reproducing information from the magnetic tape;
    a first chassis section having the cylinder provided thereon; and
    a second chassis section on which a cassette accommodating the magnetic tape is mountable, the second chassis section being movable with respect to the first chassis section;
    wherein in accordance with the movement of the second chassis section, the arm section pivots from the second location to the first location.

5. A magnetic recording and reproduction apparatus according to claim 4, wherein:
    the first chassis section has a first chassis surface having the cylinder thereon, and a second chassis surface substantially perpendicular to the first chassis surface;
    the capstan section includes a pivoting adjusting section for pivoting the capstan section along a plane parallel to the second chassis surface so as to adjust a tilt of the capstan section;
    the second chassis surface has an engaging section engageable with the pivoting adjusting section;
    the pivoting adjusting section pivots in accordance with the pivoting of the capstan section; and
    the pivoting center of the pivoting adjusting section substantially matches the position of the maintaining section.

6. A magnetic recording and reproduction apparatus according to claim 1, wherein when the arm section pivots from the second location to the first location, the tape guide section is located in the vicinity of the maintaining section.

7. A magnetic recording and reproduction apparatus according to claim 1, further comprising a plurality of guide posts for guiding the magnetic tape; wherein:
    one of the plurality of guide posts is the tape guide section; and
    when the arm section pivots from the second location to the first location, the tape guide section is closest to the capstan section among the plurality of guide posts.

* * * * *